United States Patent [19]
Takano

[11] Patent Number: 6,148,787
[45] Date of Patent: Nov. 21, 2000

[54] ACCESSORY DRIVE FOR ENGINE

[75] Inventor: Tomotaka Takano, Iwata, Japan

[73] Assignee: Yamaha Hatsudoki Kabushiki Kaisha, Iwata, Japan

[21] Appl. No.: 09/309,632

[22] Filed: May 11, 1999

[30] Foreign Application Priority Data

May 11, 1998 [JP] Japan ................................. 10-127964

[51] Int. Cl.[7] ........................................................ F02F 7/00
[52] U.S. Cl. ........................ 123/195 A; 123/508; 123/509
[58] Field of Search ............................ 123/195 A, 195 C, 123/198 R, 198 L, 90.38, 508, 509

[56] References Cited

U.S. PATENT DOCUMENTS

| | | | |
|---|---|---|---|
| 4,516,546 | 5/1985 | Choushi et al. | 123/195 A |
| 4,662,320 | 5/1987 | Moriya | 123/198 C |

Primary Examiner—Noah P. Kamen
Attorney, Agent, or Firm—Knobbe, Martens, Olson & Bear LLP

[57] ABSTRACT

An accessory drive for an overhead cam internal combustion engine wherein the accessory may comprise a high pressure positive pump for a fuel injection system. The engine includes at least one camshaft that is rotatably journaled within a cam chamber formed by a main cylinder head member and a cam cover that is affixed to it. One end of this camshaft is journaled by a bearing cap that has a portion which extends forwardly beyond the cam chamber and which cooperates with the main cylinder head member to define a recess in which a portion of the housing of the accessory is contained and affixed. An accessory drive shaft extends through this mounting portion and is drivingly coupled to the camshaft end. If desired, this front bearing cap may also mount a timing sensor that will project through the cam cover.

16 Claims, 6 Drawing Sheets

ACCESSORY DRIVE FOR ENGINE

BACKGROUND OF THE INVENTION

This invention relates to an accessory drive for an engine and more particularly to an improved arrangement for driving an accessory such as a high pressure fuel pump from one of the camshafts of an engine.

There have been proposed a variety of ways in which accessories are driven off of the engine and these drives are adapted, in part, to the specific accessory driven. One such engine driven accessory may comprise a high pressure fuel pump for supplying fuel to the charge forming system of an engine. Where direct cylinder injection is employed, this high pressure pump may a positive type pump that supplies the high pressure necessary for direct cylinder injection.

There is, obviously, an advantage in mounting the fuel pump in close location to the fuel injectors. This reduces the length and number of external conduits and avoids the possibility of pressure drops and leakage. In order to accomplish this, it has been proposed to drive the high pressure pump off of one end of one of the camshafts.

Of course, the camshaft is contained within a cam cover in a chamber that is defined by the cylinder head and the cam cover. This means that the pump drive must extend into the cam chamber for driving the pump and also that the pump body must be mounted on the exterior surface of the cylinder head assembly. Frequently, this involves either attaching bolts passing through both the cylinder head and the cam cover or only one of these arrangements. Because the cylinder head and the cam cover are not accurately aligned, for the most part, this provides a problem with insuring alignment of the fasteners. Furthermore, these types of mounting arrangements tend to provide an engine that has greater than desired overall length.

Also it is common to incorporate a housing at this end of the engine upon which the accessory is mounted. This housing includes the drive from the cam shaft to the accessory.

It is, therefore, a principal object of this invention to provide an improved camshaft driven engine accessory for an internal combustion engine.

It is a further object of this invention to provide an improved mounting and driving arrangement for the high pressure fuel pump of a fuel injected overhead cam engine.

It is a still further object of this invention to provide a mounting arrangement for the high pressure pump driven by a camshaft and which has a rigid and more accurately aligned mounting arrangement.

SUMMARY OF THE INVENTION

This invention is adapted to be embodied in an internal combustion engine having a cylinder head in which a camshaft is journaled for rotation. The camshaft is journaled for rotation within a cam chamber that is closed by a cam cover that is affixed to the cylinder head. One end of the camshaft is supported by a bearing cap that has a portion that extends forwardly beyond the cam cover and which defines with the cylinder head a cavity in which a mounting portion of a fuel pump is received. The cam cover is in sealing engagement with this extending portion of the bearing cap for providing an oil seal in this area. The fuel pump has a driving element that extends into the cavity and which is in driving engagement with the end of the camshaft.

DETAILED DESCRIPTION OF THE PREFERRED EMBODIMENT

Figure 1:
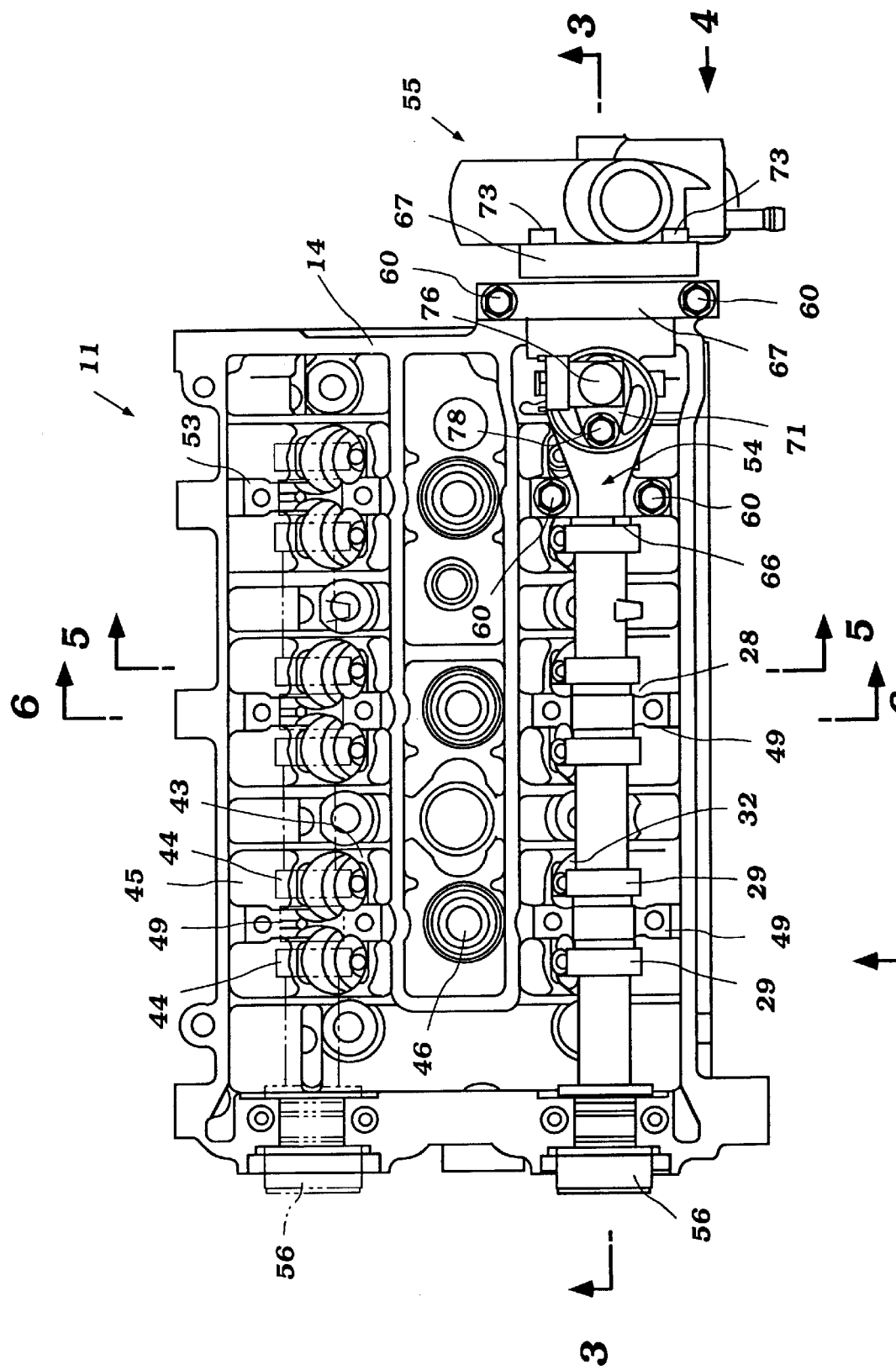
FIG. 1 is a top plan view of a cylinder bead of an internal combustion engine constructed in accordance with an embodiment of the invention, with the cam cover removed and with one of the camshafts and the valve actuating mechanisms associated with them also removed. The removed camshaft is shown partially in phantom.

Referring now in detail to the drawings, a cylinder head assembly, indicated generally by the reference numeral 11, of an internal combustion engine constructed in accordance with an embodiment of the invention is illustrated. The cylinder head assembly 11 is adapted to be detachably affixed to a cylinder block, indicated generally by the reference numeral 12, and in which cylinder bores 13 are formed.

In the illustrated embodiment, the cylinder block 12 has three aligned cylinder bores 13. Obviously, the invention may be practiced with engines having other numbers of cylinder bores and also may be embodied in engines having V or opposed cylinder banks, each of which has a cylinder head assembly 11 of the type described or connected to its respective portion of the cylinder block 12.

The cylinder head assembly 11 is comprised primarily of a main cylinder head member 14 that has recesses 15 formed in its lower surface which cooperate with the cylinder bores 13 and pistons 16 reciprocating therein to form the combustion chambers of the associated engine. At times, the recesses 15 will be referred to as the combustion chambers since, at top dead center position, they form the substantial portion of the clearance volume of the engine.

A cam chamber 17 is formed at the upper end of the cylinder head member 14 and is closed by a cam cover 18. The cam cover 18 has a peripheral flange 19 in which a sealing gasket 21 is received for sealing engagement with an upper surface 22 of the cylinder head member 14 around the cam chamber 17.

It has been noted that pistons 16 are supported for reciprocation in the cylinder bores 13. These pistons are connected by connecting rods to drive a crankshaft in a well known manner and since that forms no portion of the invention, this construction has not been illustrated. Those skilled in the art will readily understand how the invention can be practiced with basic conventional or known engine structures.

Figure 5:
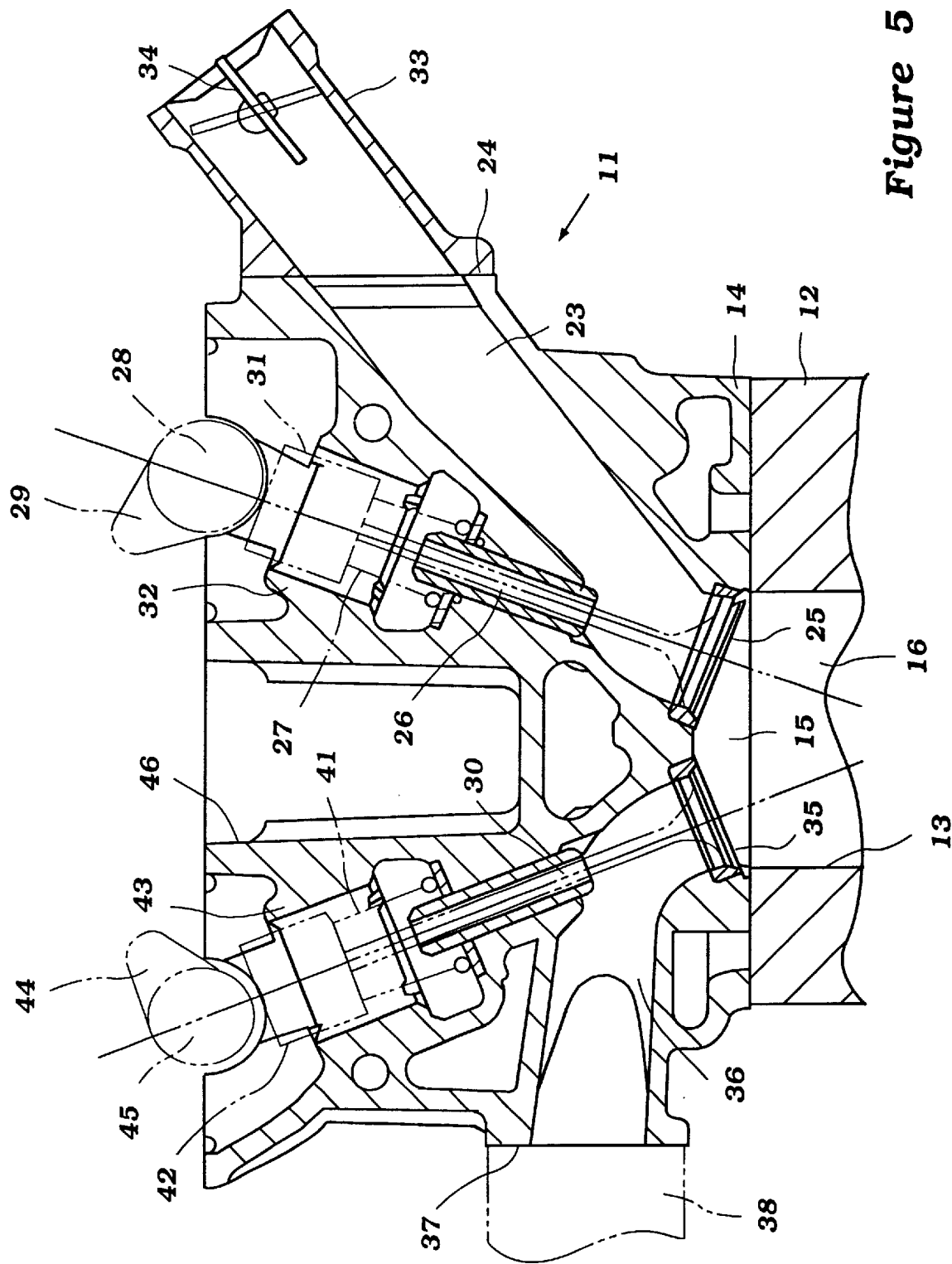
FIG. 5 is a cross-sectional view taken along the line 5—5 of FIG. 1 and passes through one of the intake valves and one of the exhaust valves.

As best seen in FIG. 5, a pair of intake passages 23 are formed in one side of the cylinder head member 14 and extend from inlet openings formed in an outer surface 24 thereof. These intake passages 23 terminate at intake ports 25 that are valved by poppet-type intake valves 26.

These intake valves 26 are urged to their closed positions by means of coil compression springs 27. An intake camshaft 28 is journaled in the cylinder head assembly 11 in a manner which will be described and has cam lobes 29 thereon which cooperate with thimble tappets 31 contained within bosses 32 of the cylinder head member 14 for opening the intake valves 26 in a well known manner. The drive for the intake camshaft 28 will be described shortly.

A manifold or throttle body assembly 33 is affixed to the cylinder head surface 24 in a known manner and includes flow control or throttle valves 34 for controlling the flow of air into the combustion chambers 15 through the intake passages 23. Again, any suitable form of induction system can be practiced in conjunction with the invention.

The intake ports 25 are disposed so that they lie on substantially one side of a plane containing the axis of the cylinder bores 13. Exhaust ports 35 are formed on the opposite side of this plane at the inlets of exhaust passages 36 formed on this side of the cylinder head member 14.

These exhaust passages 36 terminate in discharge openings in a face 37 of the cylinder head member 14. An exhaust manifold 38 shown in phantom in FIG. 5 is provided for collecting the exhaust gases and discharging them to the atmosphere in any known manner.

Exhaust valves 39 are slidably supported in the cylinder head assembly and have head portions that valve the exhaust ports 35. Coil compression springs 41 urge these exhaust valves to their closed positions.

Thimble-type tappets 42 are received in bosses 43 formed in the cylinder head member. These thimble tappets 42 cooperate with the valves 39 to open them under the action of the cam lobes 44 of an exhaust camshaft 45 which is also journaled in the cylinder head member 14 in a manner which will be described.

The cylinder head member 14 is formed with central spark plug wells 46 that are disposed substantially on the axis of the cylinder bores 13. Spark plugs 47 are received in these wells 46. The spark plugs 47 have their spark gaps 48 disposed substantially on the cylinder bore axes. The spark plugs 47 are fired by any suitable ignition system.

The journaling and drive for the camshafts 28 and 45 will now be described. As may be best seen in FIG. 1, the area between the lobes of the camshafts 28 and 45 are formed with respective bearing surfaces that are journaled in beams 49 formed in the cylinder head member 14. These beams receive cooperating bearing caps 51 and 52 for journaling the intake and exhaust camshafts 28 and 45, respectively, over the two cylinders at the rear end of the engine. The bearing caps 51 and 52 are held in place by threaded fasteners 50.

There is a similar beam 53 formed at the front of the cylinder head member 14 with which, at least on the intake side, a specially formed bearing cap, indicated generally by the reference numeral 54 is provided. This special bearing cap 54 is provided for the remaining bearing surface of the camshaft which drives an external accessory, indicated generally by the reference numeral 55 and which comprises, in this embodiment, a high pressure positive fuel pump.

It should be understood that this fuel pump 55 may be driven from either camshaft 28 or 45 or there may be accessories driven from both camshafts in the way described. In the illustrated embodiment, however, only a single accessory is driven and hence the forward-most end of the exhaust camshaft 45 is also journaled by a conventional bearing cap 52 of the type used for the other bearings thereof.

Figure 2:
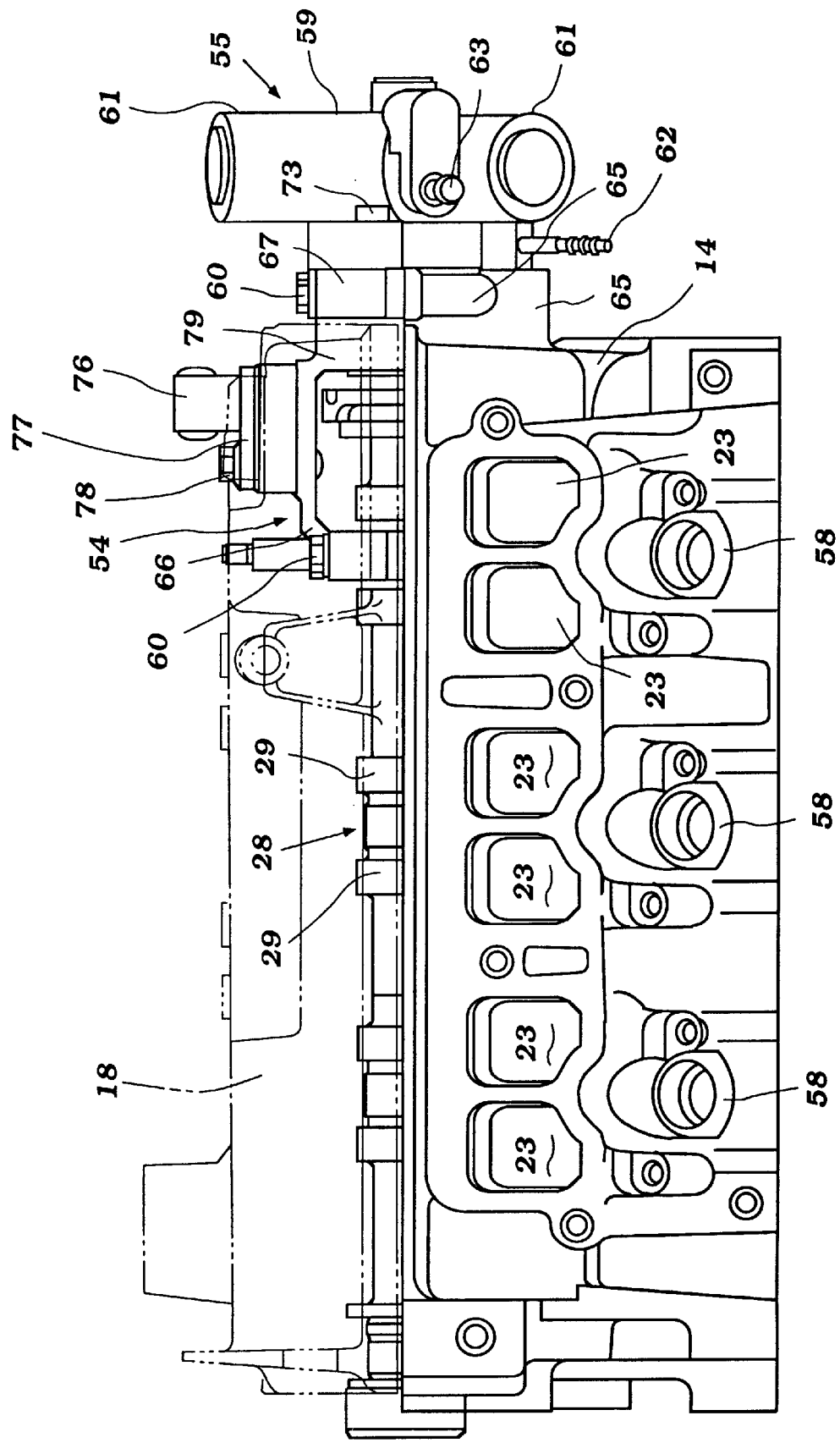
FIG. 2 is a side elevational view of the cylinder head looking generally in the direction of the arrow 2 in FIG. 1 and on a slightly larger scale. The removed cam cover is shown in phantom lines in this figure.
Figure 3:
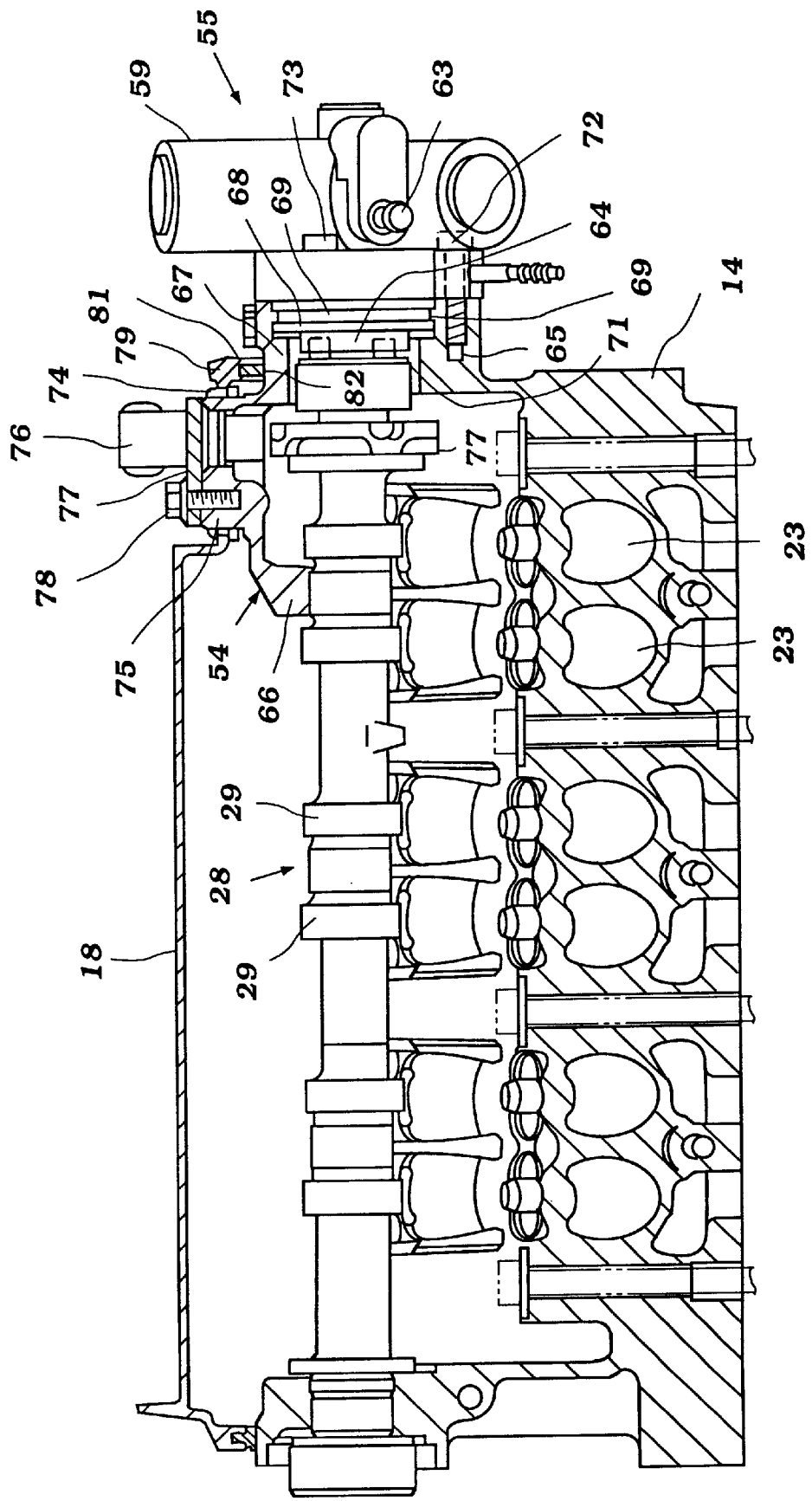
FIG. 3 is an enlarged cross-sectional view taken along the line 3—3 of FIG. 1.
Figure 4:
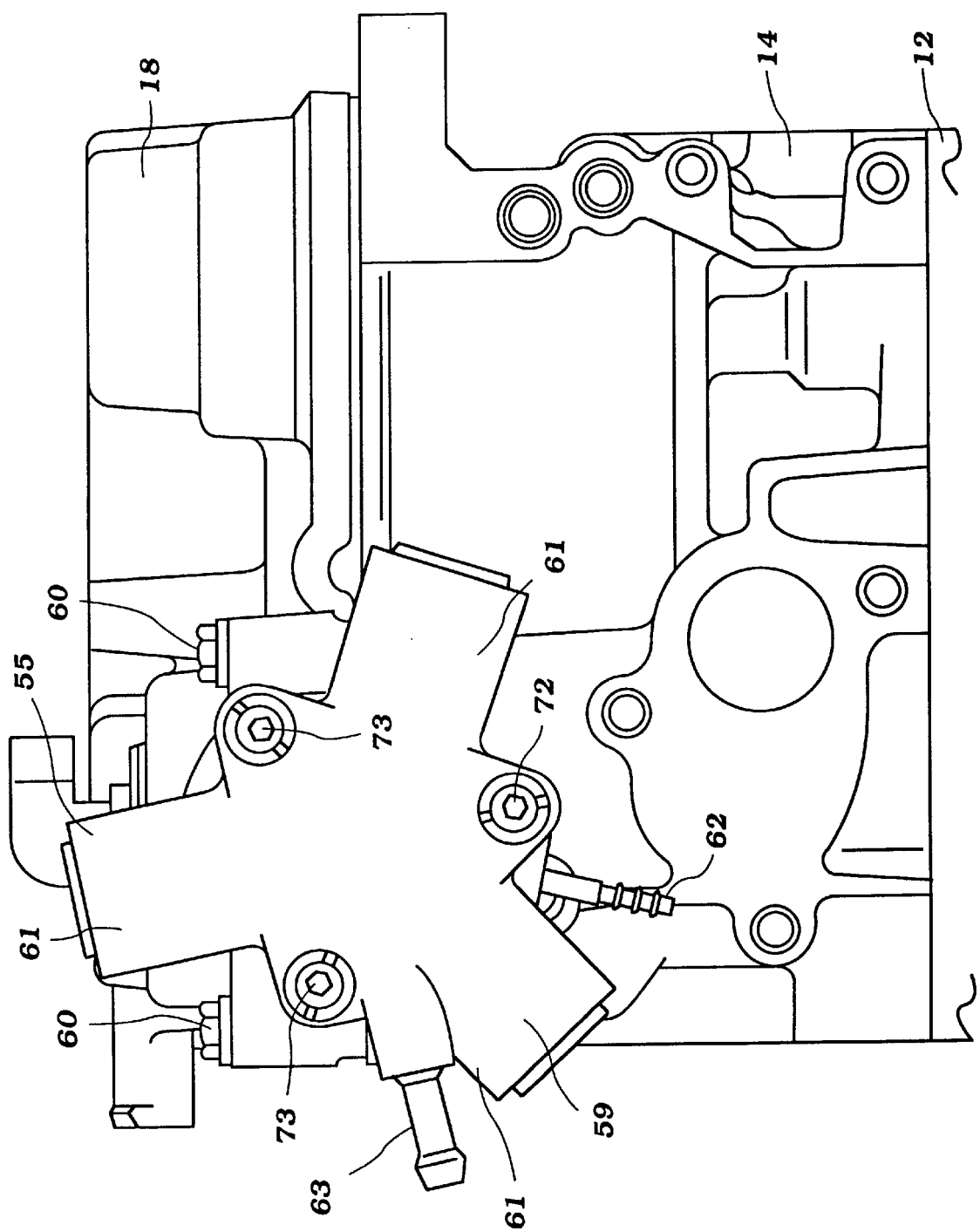
FIG. 4 is an enlarged front elevational view of the cylinder head assembly looking generally in the direction of the arrow 4 in FIG. 1.

As may be best seen in FIGS. 1–3, each of the camshafts 28 and 45 is formed with a drive portion 56 at the rear end thereof. These drive portions 56 receive sprockets or pulleys to effect a drive from the crankshaft of the engine. As is well known in the art, the camshafts 28 and 45 are driven at one-half crankshaft speed and thus either a belt or chain drive is provided to the driving elements mounted on the camshaft portions 56. Again, any known type of drive may be provided for this purpose.

Figure 6:
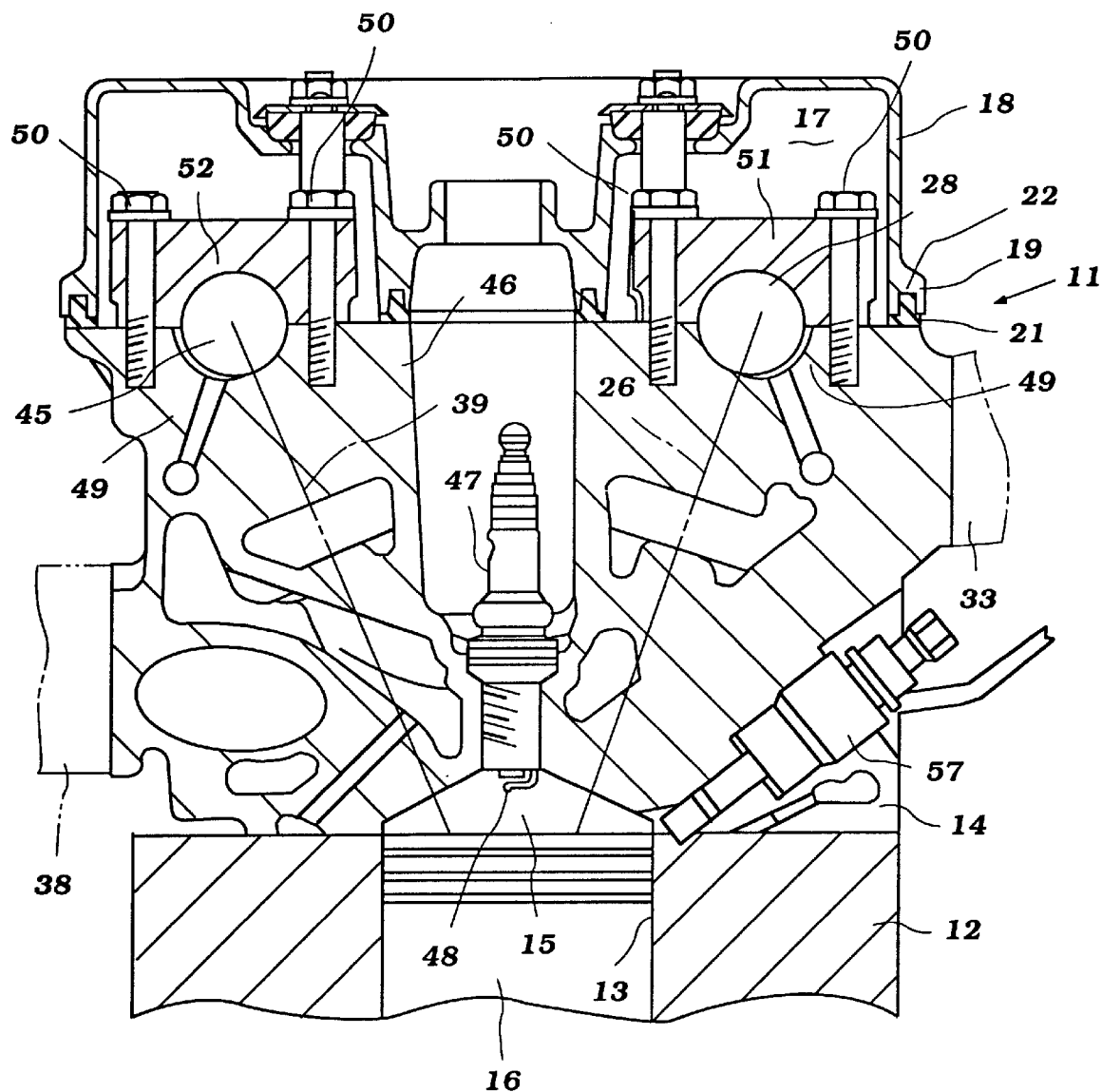
FIG. 6 is a cross-sectional view taken along the line 6—6 of FIG. 1 and passes through the axis of the cylinder bore.

It is has been noted that the accessory 55 is a high pressure fuel pump in the illustrated embodiment. This fuel pump supplies fuel under high pressures to fuel injectors 57 (FIG. 6) that are mounted in the cylinder head member 14 and which lie below the intake passages 23 and which are mounted in bosses 58 (FIG. 2) formed in the main cylinder head member 14 below the intake passages 23 and between those for each respective cylinder.

Turning now specifically to the important feature of the invention, that being the mounting and drive for the accessory 55, this construction appears best in FIGS. 1–3 and will be described primarily by general reference to these figures.

First, it should be noted that the high pressure fuel pump 55 has an outer housing 59 in which pumping plungers are supported. These pumping plungers may be mounted in radial projections 61 formed by the outer housing 59.

Inlet and outlet fittings 62 and 63 deliver fuel to the housing 59 and discharge it under high pressure, respectively, to the fuel injectors 57 through a suitable fuel supply system.

The high pressure fuel pump 55 includes a drive shaft which has affixed to it a drive element 64 (FIG. 3) which extends inwardly beyond the housing 59 and into an area that is defined by a forwardly extending projection 65 of the cylinder head member 14. The forward-most accessory drive bearing cap 54 has a first bearing portion 66 that cooperates with the forward-most bearing surface of the intake camshaft 28 for its journaling. In addition, this bearing cap 54 has a forwardly extending portion 67 which overlies the cylinder head projection 65 and thus defines a cavity therebetween into which the driving element 64 of the high pressure pump 65 extends. The accessory drive bearing cap 54 is fixed to the cylinder head 14 by threaded fasteners 60.

The pump housing 59 has an annular projection 68 in which the pump shaft is journaled and which defines a groove 69. An O-ring seal (not shown) is positioned in this groove 69 and acts to preclude oil leakage from forwardly of the cam chamber 17.

The forward portion of the intake camshaft 28 is provided with a driving member 71 which has lugs or projections that extend into receptacles on the high pressure pump driving member 64 so as to provide a positive driving connection therebetween.

The pump housing 59 is affixed to the cylinder head assembly 11 by means of threaded fasteners 72 and 73. The lower threaded fastener 72 is received in a tapped hole formed in the projection 65 of the main cylinder head member 14. The remaining fasteners 73 are threaded into tapped openings formed in the forward-most portion 67 of the accessory drive, bearing cap 54. Thus, the pump assembly 55 is mounted to two elements of the cylinder head assembly 11 that are rigidly fixed and located relative to each other.

In accordance with another feature of the invention, the cam cover 18 is provided with a forward-most opening 74 through which a projecting part 75 of the accessory drive bearing cap 54 extends. This projecting portion carries a sensor 76 of the electrical inductive type which cooperates with a timing wheel 77 formed integrally with the intake camshaft 28. Thus the sensor provides pulse signals indicative of the rotational position and speed of the camshaft 28 and, accordingly, of the engine. This timing sensor 76 is held in place by a retainer plate 77 that is affixed to the bearing cap projection 75 by a threaded fastener 78.

Forwardly of the opening 74 in the cam cover 18 is provided with a ridge-like portion 79 that has a groove 81 to receive an oil seal 82 that is in sealing engagement with the bearing cap 67 so as to further ensure against the leakage of oil.

Therefore, it should be readily apparent from the foregoing description that the described arrangement provides a very good and positively located arrangement for mounting the high pressure pump 55 or other similar engine accessory and which maintains a very compact overall engine configuration. Of course, the foregoing description is that of a preferred embodiment of the invention and various changes and modifications may be made without departing from the spirit and scope of the invention, as defined by the appended claims.

What is claimed is:

1. An internal combustion engine having a cylinder head a camshaft journaled for rotation within a cam chamber formed in part by cylinder head and that is closed by a cam cover affixed to said cylinder head, one end of said camshaft being journaled by a bearing cap fixed to said cylinder head, said bearing cap having a portion that extends forwardly beyond said cam cover and which defines with said cylinder head a cavity, an engine accessory having a mounting portion received in said cavity, said cam cover being in sealing engagement with said bearing cap extending portion for providing an oil seal therewith, and said engine accessory having a driving element that extends into said cavity and which is in driving engagement with the end of the camshaft for driving said engine accessory.

2. An internal combustion engine as set forth in claim 1 wherein the engine accessory has an outer housing in which the driving element is journalled and further including fastening means for affixing said outer housing to at least one of the cam cover and the cylinder head.

3. An internal combustion engine as set forth in claim 2 wherein the fastening means affixing the outer housing to the cam cover.

4. An internal combustion engine as set forth in claim 2 wherein the fastening means affixing the outer housing to the cylinder head.

5. An internal combustion engine as set forth in claim 2 wherein the fastening means affixing the outer housing to both of the cam cover and the cylinder head.

6. An internal combustion engine as set forth in claim 1 wherein a timing sensor is carried by the bearing cap and cooperating with the camshaft for providing a signal indicative of the timing relationship of said engine.

7. An internal combustion engine as set forth in claim 6 wherein the cam cover is formed with an opening through which the bearing cap may be accessed and further including a cover plate affixed to and closing said opening.

8. An internal combustion engine as set forth in claim 7 wherein the timing sensor extends through the cam cover opening through which the timing sensor may be removed and installed.

9. An internal combustion engine as set forth in claim 8 wherein the bearing cap has a portion that extends through the cam cover opening and which supports the timing sensor.

10. An internal combustion engine as set forth in claim 1 wherein the engine accessory comprises a high pressure fuel pump.

11. An internal combustion engine as set forth in claim 10 further including at least one fuel injector mounted in the cylinder head and supplied with fuel by the high pressure fuel pump.

12. An internal combustion engine as set forth in claim 11 wherein the at least one fuel injector is mounted on a side of the cylinder head and the cam shaft is journalled on the same side of the cylinder head.

13. An internal combustion engine having a cylinder head a camshaft journaled for rotation within a cam chamber formed in part by cylinder head and that is closed by a cam cover affixed to said cylinder head, one end of said camshaft being journalled by a bearing cap fixed to said cylinder head, said bearing cap having a portion that extends forwardly beyond said cam cover and which defines with said cylinder head a cavity, an engine accessory having a mounting portion received in said cavity, said engine accessory having a driving element that extends into said cavity and which is in driving engagement with the end of the camshaft for driving said engine accessory, said engine accessory having an outer housing in which said driving element is journalled, and fastening means for affixing said outer housing to at least one of the cam cover and the cylinder head.

14. An internal combustion engine as set forth in claim 13 wherein the fastening means affixing the outer housing to the cam cover.

15. An internal combustion engine as set forth in claim 13 wherein the fastening means affixing the outer housing to the cylinder head.

16. An internal combustion engine as set forth in claim 13 wherein the fastening means affixing the outer housing to both of the cam cover and the cylinder head.

* * * * *